(No Model.)
H. T. FARNSWORTH.
PULLEY
No. 343,018. Patented June 1, 1886.
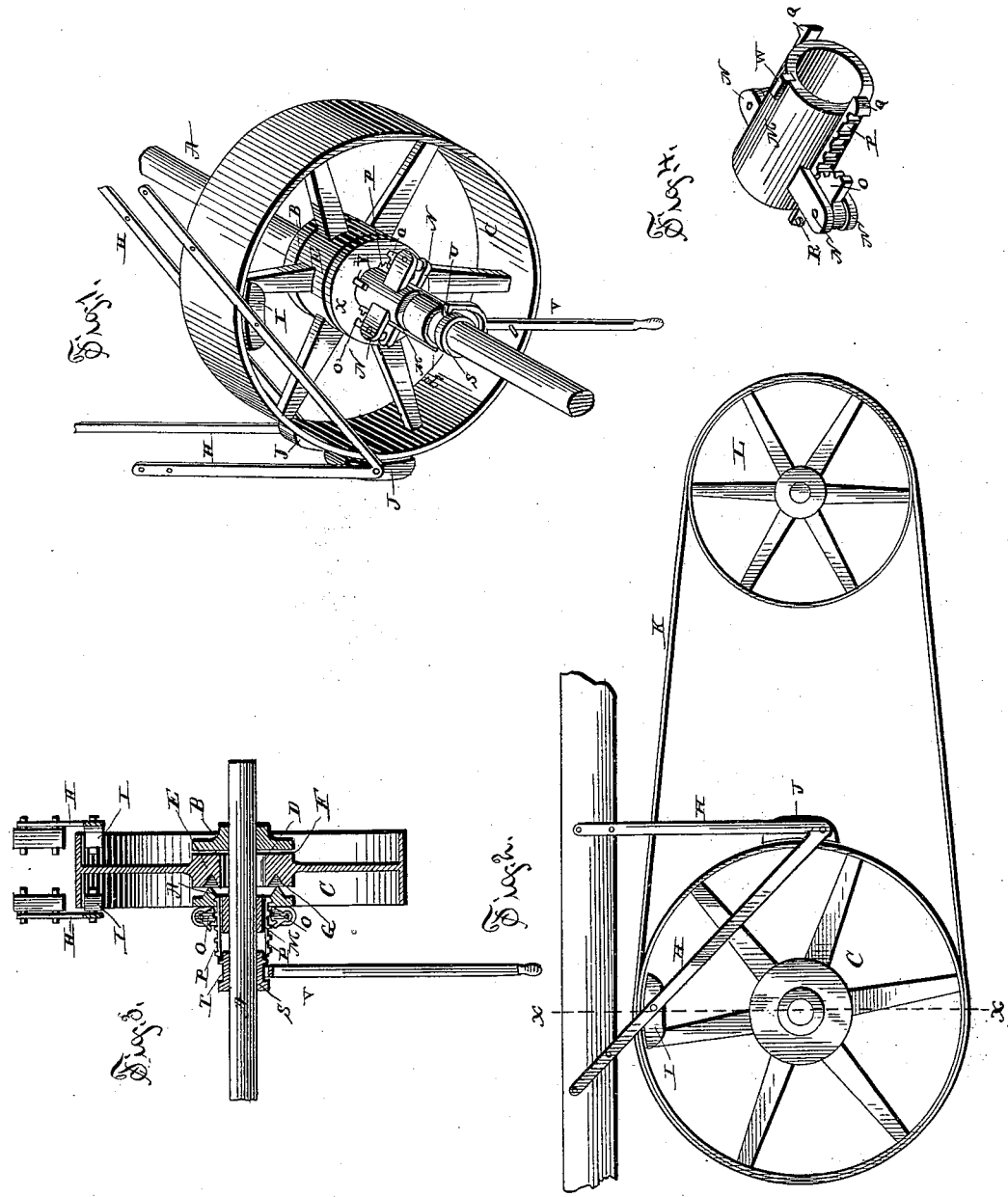
WITNESSES
F. L. Ourand
Edward Stanton
INVENTOR
Henry T. Farnsworth,
By Louis Bagger & Co.
Attorneys.

UNITED STATES PATENT OFFICE.

HENRY T. FARNSWORTH, OF RICHMOND, VIRGINIA.

PULLEY.

SPECIFICATION forming part of Letters Patent No. 343,018, dated June 1, 1886.

Application filed February 11, 1886. Serial No. 191,572. (No model.)

*To all whom it may concern:*

Be it known that I, HENRY T. FARNSWORTH, a citizen of the United States, and a resident of Richmond, in the county of Henrico and State of Virginia, have invented certain new and useful Improvements in Pulleys; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a portion of a shaft provided with my improved pulley and its appurtenances. Fig. 2 is a side view of the same, showing the belt and the pulley to be driven from the drive-pulley. Fig. 3 is a longitudinal vertical sectional view on line *x* *x*, Fig. 2; and Fig. 4 is a perspective detail view of the rigid sleeve or hub.

Similar letters of reference indicate corresponding parts in all the figures.

My invention has relation to pulleys which it is desirable to either have revolving with the shaft upon which they are secured or to have stationary while the shaft revolves within them—as, for instance, pulleys secured upon a drive-shaft and connected by means of a belt or chain to another pulley upon the machine to be driven; and it consists in the improved construction and combination of parts of such a pulley which may revolve with the shaft or be released from the shaft, which will revolve within the pulley, as hereinafter more fully described and claimed.

Drive-shafts have generally been provided with a pulley having its face of twice the width of the belt passing over it, and the shaft of the machine which is to be driven from the drive-pulley is provided with a pulley secured upon the shaft, and a loose pulley, so that when it is desired to stop the machine the belt is shifted by suitable shifting or shipping mechanism from the rigid pulley to the loose pulley, which will revolve upon the machine-shaft without imparting any motion to the same. This construction has several drawbacks—such as causing considerable wear upon the shaft upon which the loose pulley revolves, as well as also the presence of the continually-revolving belt, which makes it more or less dangerous to move about the machine, either causing danger to the operative on account of the liability of the belt to catch loose portions of the clothing, as well as also causing danger to a person repairing, inspecting, or oiling the machine, on account of the liability of the belt by some movement or other cause to be shipped from the loose pulley to the rigid pulley, setting the machine in motion and endangering the life or limbs of the person engaged about the machine. These drawbacks I avoid by the construction which I shall now proceed to describe, and in which the shaft revolves within a bore in the hub of the pulley when the pulley is disengaged from the shaft, which is considerably larger than the shaft, so that the shaft does not come in contact with the bore of the pulley, which is suspended, and the loose pulley is dispensed with in this pulley-connection, and the belt and driven pulley of the machine, as well as the drive-pulley, remain stationary when the pulley is disengaged, so that I obtain by this construction a pulley in which there is no wear when the pulley is not revolved and in which there is no danger to the operative of the machine when the pulley is disengaged from the drive-shaft.

In the accompanying drawings, the letter A indicates the drive-shaft, which is provided with a rigid flange, B, having a flat inner face.

The drive-pulley C may be of any suitable construction, and has a bore, D, of considerably larger diameter than the shaft, and the hub E of the pulley is formed with one flat end, F, which bears against the flat face of the flange, while the other face or end of the hub is formed with an annular groove, G, V-shaped in section. Two pairs of arms, H H, projecting vertically and in an inclined direction from a suitable support above the pulley and having their lower ends connected, are provided with brake-shoes I I, at the upper ends of the inclined arms, which shoes are secured a short distance below the inner face of the upper portion of the rim of the pulley, and another pair of shoes, J J, are secured at the lower ends of the vertical arms at the points of connection between the vertical arms and the inclined arms, and these shoes are supported a short distance outside of the outer face of the rim of the pulley, at about a distance of one-fourth of the periphery of the pulley from the other shoes, at the side facing toward the pulley to be driven, and at the same distance from the outside of the rim as the upper shoes are from the inner side of the rim.

It will be seen that when the pulley is not otherwise supported, the pulley will drop, having no support upon the shaft, which is of a considerably smaller diameter than the bore of the hub, and the upper shoes will support the upper portion of the rim, keeping the hub and bore of the pulley out of contact with the shaft, and the weight of the belt K, which passes over the pulley and over the driven pulley L will draw the pulley toward the shoes at the side, which will support the weight of the belt. A sleeve, M, is secured rigidly upon the shaft at a short distance from the grooved end of the hub of the pulley, and this sleeve is provided with pairs of lips N N, between the outer ends of which sector-shaped cogged pawls O are pivoted at their centers.

Cogged bars P slide between the lips engaging the sector-shaped pawls, and the inner ends of these bars or racks are provided with upwardly-projecting hooked lips Q, while the outer ends are formed with suitable removable bolts, R, which connect these ends of the bars with a grooved collar, S, secured upon the shaft to slide upon it and to revolve with it, the collar having a circumferential groove, T, into which the inwardly-projecting lugs U U of a bifurcated lever, V, project, the said lever being suitably fulcrumed and serving to shift the collar upon the shaft. The inner end of the sleeve upon the shaft is provided with longitudinal keys or feathers W, and a disk, X, having grooves Y and Z, for the reception of the feathers and the sliding racks, fits with its bore upon the sleeve, sliding upon the inner end of the same and revolving with it. The inner face of this disk is provided with an annular ridge or rib, A', V-shaped in section, and this rib fits into and corresponds to the groove in the face of the hub of the pulley, so that the disk with the groove may be fitted snugly against the face of the hub when it is slid toward the same.

It will now be seen that as the pulley is hanging stationary, suspended from the shoes, and the shaft is revolved and it is desired to set the pulley in motion, the shifting-lever is tilted so as to slide the collar with the racks toward the pulley. This will rock the cogged pawls so as to force their inner corners against the outer face of the disk with the rib, which will slide upon the inner end of the rigid sleeve until the rib engages the groove, when the inclined sides of the rib will serve to raise the pulley sufficiently to be clear of the shoes, when it will commence to revolve, together with the shaft and disk, on account of the frictional resistance between the faces of the sliding disk and the rigid flange and the ends of the hub of the pulley, the said hub being clamped between the flange and the sliding disk. When the shifting-lever is tilted to the other side, the sliding collar and the racks are drawn outward away from the pulley, tilting the pawls outward and drawing the ribbed disk away from the hub of the pulley, when the pulley will again drop and rest upon the shoes, while the shaft will continue to revolve. In this manner it will be seen that the shaft will in no manner wear within the bore of the pulley, as it is liable to do in loose pulleys or in pulleys having the shaft revolving within their bores, and having suitable clutch mechanism, by means of which they might be connected to the shaft, so as to revolve with the shaft; but in this pulley the bore of the hub of the pulley is sufficiently large to admit of the pulleys sinking a short distance when released from its clutch, and at the same time retaining its bore at a distance from the shaft, when the rim of the pulley is supported.

Having thus described my invention, I claim and desire to secure by Letters Patent of the United States—

1. The combination of a drive-shaft, a pulley upon the said shaft having a bore of a larger diameter than the shaft, a clutch upon the shaft for engaging the pulley, and supports below the rim of the pulley secured at a distance below the rim less than the distance from the shaft to the interior of the bore of the pulley, as and for the purpose shown and set forth.

2. The combination of a drive-shaft, a drive-pulley upon the said shaft having a bore of a larger diameter than the shaft, a clutch upon the shaft for engaging the pulley, and supports secured a short distance under the inner side of the upper portion of the rim of the pulley at a distance less than the distance between the exterior of the shaft and the interior of the bore of the pulley, as and for the purpose shown and set forth.

3. The combination of a drive-shaft having a rigid flange, a drive-pulley having a bore of a larger diameter than the diameter of the shaft and having one side of its hub bearing against the flange and having the other side of its hub formed with an annular groove having inclined sides, a disk sliding upon the shaft and revolving with it and having a correspondingly-shaped rib upon its inner face fitting in the groove, and supports secured below the rim of the pulley at a distance less than the distance between the exterior of the shaft and the interior of the bore of the pulley, as and for the purpose shown and set forth.

4. The combination of a drive-shaft, a drive-pulley upon the said shaft having a bore of a larger diameter than the shaft, a clutch upon the shaft for engaging the hub of the pulley, a pair of arms having a vertical portion and an inclined portion, and secured at the sides of the pulley with the vertical portions tangential to the side of the pulley, and brake-shoes secured near the upper ends of the inclined portions of the arms at a distance below the upper portion of the rim of the pulley less than the distance between the exterior of the shaft and the interior of the bore of the pulley, and secured at the lower ends of the vertical portions at the connecting-points of the vertical and inclined portions of the arms at the same distance from the outer side of the rim of the pulley at the side of the same as the upper shoes are from the inner side of the upper portion of the rim, as and for the purpose shown and set forth.

5. The combination of a drive-shaft having a flange formed with a flat inner face, a drive-pulley upon the said shaft having a bore of a larger diameter than the diameter of the shaft and having one side of its hub flat and fitting to the flat face of the flange and having the other side of its hub formed with an annular groove V-shaped in section, a clutch sliding upon and turning with the shaft and having a disk formed with an annular rib upon its inner face V-shaped in section and fitting into and corresponding to the groove, a pair of arms having vertical and inclined portions, and secured at their ends above the pulley, projecting at both sides of the pulley with their bent portions, and brake-shoes secured near the upper ends of the inclined portions and at the connecting-points of the vertical and inclined portions supported a distance from, respectively, the inner side of the upper portion of the pulley and the outer side of the side of the pulley somewhat less than the distance between the exterior of the shaft and the interior of the bore of the pulley, as and for the purpose shown and set forth.

6. The combination of a shaft having a rigid flange formed with a flat face, a pulley upon the shaft having a flat face at one end of its hub fitting the flange and having a groove in the face of the other end, a sleeve secured upon the shaft and having pairs of lips and having feathers upon its inner end, sector-shaped cogged pawls pivoted between the outer ends of the lips, racks sliding between the lips engaging the pawls and having outwardly-turned inner ends, a disk sliding upon the inner end of the sleeve and having grooves in its bore for the feathers and for the racks, and having an annular rib fitting in the groove of the hub, a circumferentially-grooved collar having the outer ends of the racks secured to it, and a shifting-lever having the ends of its upper bifurcated end engaging the groove, as and for the purpose shown and set forth.

7. The combination of a shaft having a flange formed with a flat inner face, a pulley having a bore of larger diameter than the shaft and having a flat face toward the flange and an annular groove in the other face of the hub, a sleeve secured upon the shaft and having pairs of lips upon it and having feathers upon its inner end, sector-shaped cogged pawls pivoted between the lips, racks sliding between the lips and engaging the pawls and having outwardly-projecting lips at their inner ends, a disk upon the inner end of the sleeve having an annular rib upon its inner face corresponding to and fitting in the groove of the hub and having grooves for the feathers and racks, a collar sliding upon and turning with the shaft and having a circumferential groove and having the outer ends of the racks secured to it, a shifting-lever engaging the groove of the collar with the inwardly-projecting ends of its bifurcated portion, a pair of arms consisting of inclined and vertical portions projecting at the sides of the pulley, and brake-shoes secured near the upper ends of the inclined arms and at the lower ends of the vertical portions a distance from the rim of the pulley, as and for the purpose shown and set forth.

8. The combination of a drive-shaft, a sleeve secured upon the shaft and having lips in pairs and feathers upon its inner end, sector-shaped cogged pawls pivoted between the outer ends of the lips, racks engaging the pawls and sliding between the lips, a clutch-disk secured to the inner ends of the racks and sliding upon the inner end of the sleeve, having grooves for the feathers, and a shifting-collar secured to the outer ends of the racks, sliding upon the shaft and having means for shifting it, as and for the purpose shown and set forth.

In testimony that I claim the foregoing as my own I have hereunto affixed my signature in presence of two witnesses.

HENRY T. FARNSWORTH.

Witnesses:
GEO. CAMPBELL,
THOS. A. KIRBY.